United States Statutory Invention Registration [19]

[11] Reg. Number: H213

Panlaqui [43] Published: Feb. 3, 1987

[54] DISICCANT PLUG FOR MISSILE LAUNCHER

[75] Inventor: Clayton E. Panlaqui, Palm Springs, Calif.

[73] Assignee: The United States of America as represented by the Secretary of the Navy, Washington, D.C.

[21] Appl. No.: 874,305

[22] Filed: Jun. 2, 1986

[51] Int. Cl.[4] ..... F41F 3/042

[52] U.S. Cl. ..... 89/1.8; 42/96; 89/1.816; 89/1.817

[56] References Cited

U.S. PATENT DOCUMENTS

| | | | |
|---|---|---|---|
| 2,469,350 | 5/1949 | Lauritsen | 89/1.814 |
| 2,983,063 | 5/1961 | Douville et al. | 42/1.11 |
| 3,115,010 | 12/1963 | Collier | 60/200.1 |
| 3,766,828 | 10/1973 | Cords | 89/1.8 |
| 4,084,340 | 4/1978 | Scudder | 42/96 |

*Primary Examiner*—David H. Brown

*Attorney, Agent, or Firm*—Robert F. Beers; W. Thom Skeer; Stephen J. Church

[57] ABSTRACT

A desiccant containing plug for insertion through a launcher tube into a missle containing tube which is coaxially received in one end of the launcher tube. The plug has a perforate end which extends into the container tube and which is circumscribed by a humidity sealing ring fitted to the container tube interior. The plug has a valve disk disposed at the perforate end and actuated from the closed end to open and close communication through the perforate end to the desiccant.

5 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DISICCANT PLUG FOR MISSILE LAUNCHER

BACKGROUND OF THE INVENTION

1. Field of the Invention

This invention pertains to the field of ordnance. More particularly, it pertains to the field of rocket launchers in which a rocket is launched from a container.

2. Description of the Prior Art

Rocket propelled missiles are commonly shipped and stored in individual tubes which also serve as launching tubes, each tube with its contained missile being attached for firing to a reloadable launcher. Typically, the tube is provided with a detachable cover which hermetically seals one end of the tube and is removed prior to mounting the tube on the launcher by insertion of the tube into an extension tube of the launcher. Prior to removal of the cover, the missile is protected from moisture by a quality of desiccant which, typically, is disposed in the cover. However, when the tube is mounted on the launcher the desiccant is removed with the cover and, in any event, is exposed to the environment and absorbs moisture so that the missile is no longer protected from moisture and becomes inoperational, or, at least, must be taken out of service for drying.

It is known to insert a detachable cylindrical plug containing desiccant into a gun barrel to keep the interior thereof from rusting. It is also known to utilize a pair of such plugs, which are fitted in the opposite barrel ends which in use and which interfit when not in use, to prevent vitiation of desiccant in one of the plugs.

SUMMARY OF THE INVENTION

The present invention is a desiccant containing plug which extends through a missile launcher extension tube into the open end of a missile containing launch tube fitted to the extension tube. The plug is provided with a seal disposed within the launch tube and with a valve for selectively opening the desiccant to the launch tube or closing off the desiccant from the environment.

It is a object of the subject invention to provide a desiccant plug to protect a tube contained missile from humidity when the missile is in standby status and is mounted in a launcher.

Another object is to provide such a desiccant plug which is easily adapted to and is fully effective with existing missile containing launch tubes and launchers.

A further object is to provide such a desiccant plug which protects desiccant therein from vitiation when the plug is not in use.

BRIEF DESCRIPTION OF THE DRAWINGS

These and other objects, novel features, and advantages of the subject invention will be apparent from the following detailed description when considered with the accompanying drawings in which.

DESCRIPTION OF THE PREFERRED EMBODIMENT

Figure 1:
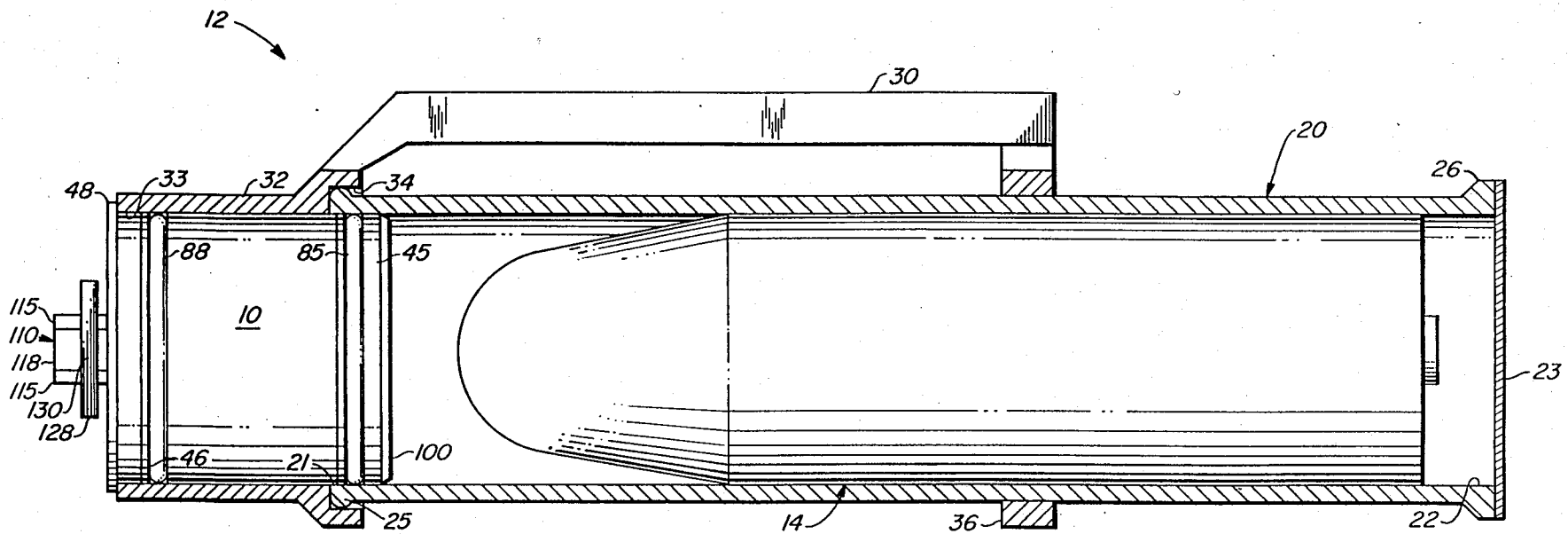
FIG. 1 is a view of a desiccant plug, which embodies the present invention and is in a closed configuration, in a simplified operating environment.

A desiccant plug 10, which embodies the principles of the subject invention, is shown in FIG. 1, together with a launching apparatus, which is indicated generally by the numeral 12, and a missile 14.

Figure 3:
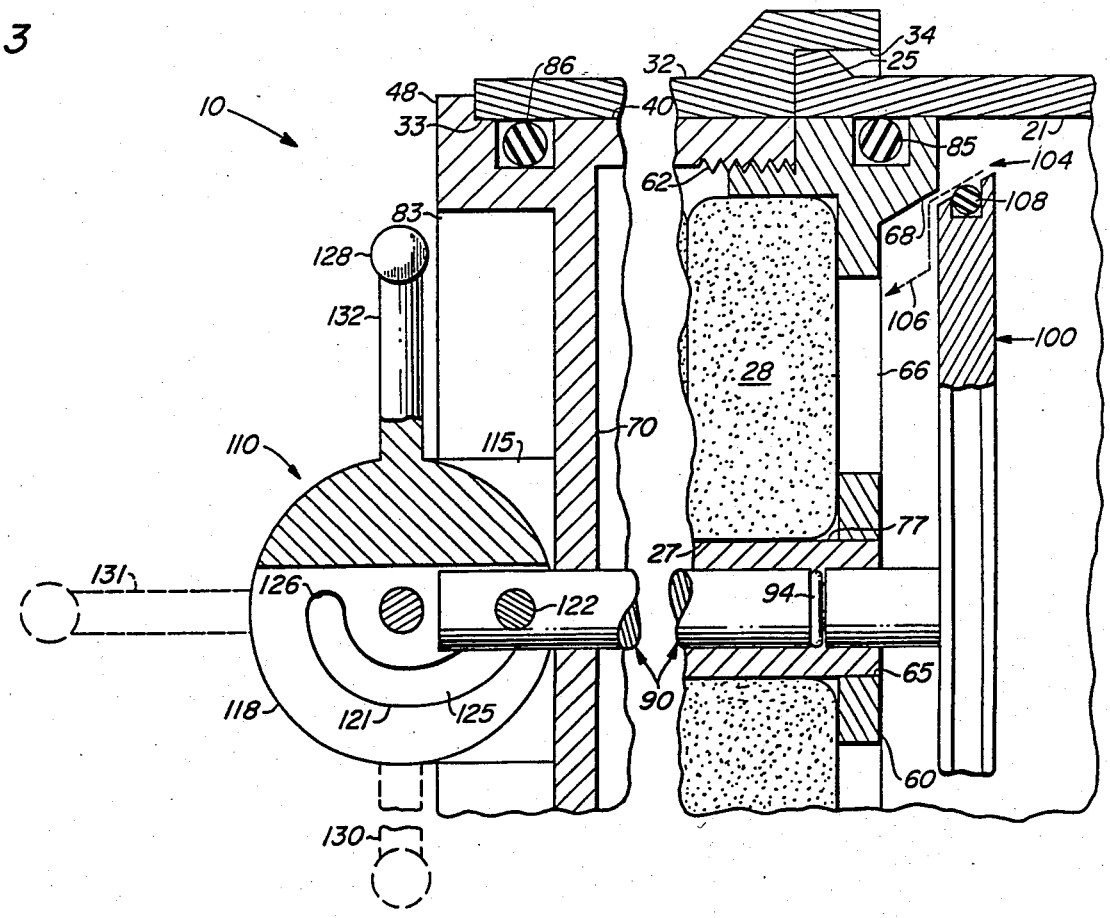
FIG. 3 is a section of the plug together with fragmentary portions of its environment taken from the position of line 3—3 of FIG. 2, the plug being shown in an open configuration with a substantial portion thereof broken away for illustrative convenience.

Apparatus 12 includes a cylindrical container tube 20 in which missile 14 is received between an open nose end 21 of the tube and a tail end 22 thereof. End 22 is hermetically closed by a diaphragm 23. Tube 20 has flanges 25 and 26 which, respectively, circumscribe the tube at its ends 21 and 22. Missile 14, which is adversely affected by humidity, is stored and shipped in tube 20 with the tube ends 21 and 22 closed by a pair of caps, not shown. The cap used at flange 25 is constructed to hermetically close tube end 21 and contains a single desiccant receptacle. Typically, such a receptacle, of which three are shown in FIG. 3 removed from corresponding such caps, is a toroidal package 27 containing a quantity of desiccant 28.

Apparatus 12 has a frame 30 configured in any suitable manner, not shown, for mounting on a vehicle, also not shown, from which missile 14 is to be fired. Apparatus 12 has a launcher tube 32 which is of predetermined axial length, is mounted on frame 30 and has an open forward end 33 and an open rearward end 34. End 34 has a counterbore which slidably receives flange 25 on nose end 21 of tube 20 when tubes 20 and 32 are in coaxial alignment, these tubes being maintained in such alignment by any suitable clamp 36 which is adapted to releasably retain tube 20 on frame 30.

Figure 2:
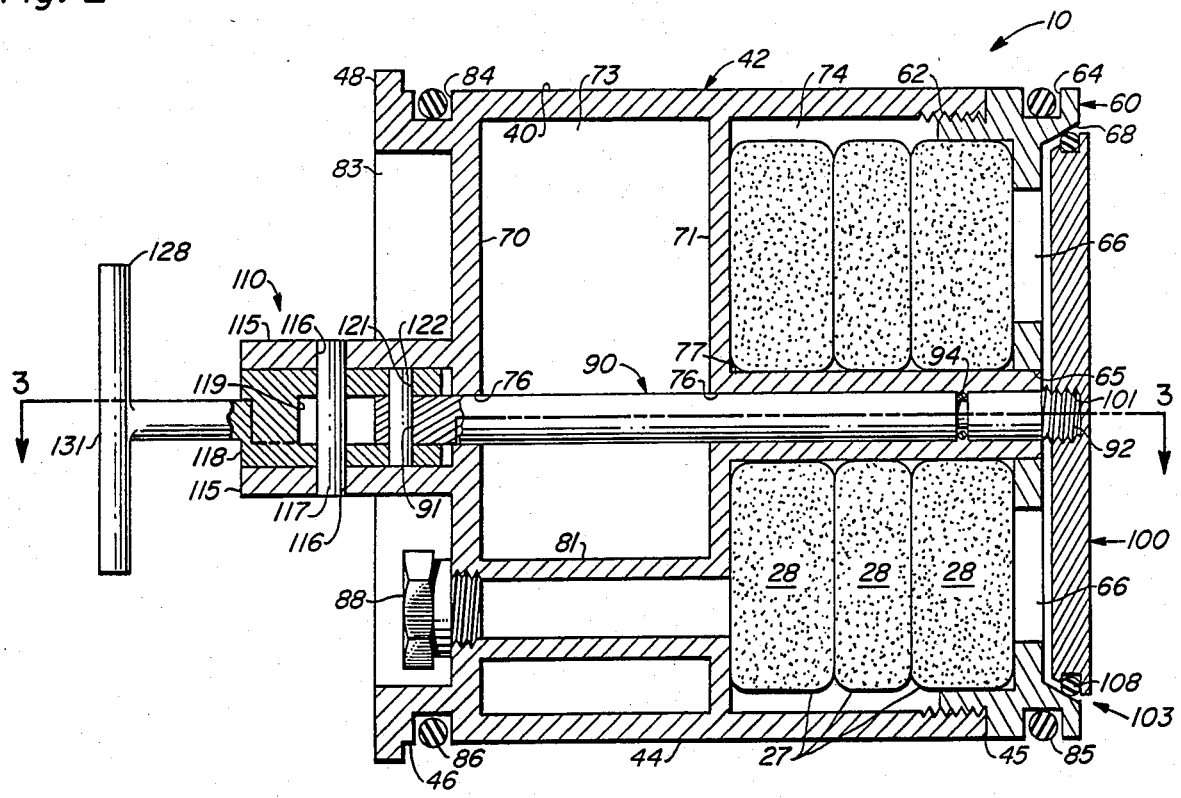
FIG. 2 is a section of the plug in a closed configuration with a handle of the plug disposed for manipulation.

Plug 10, as best shown in FIG. 2, is of hollow cylindrical configuration and has a periphery 40 which is slidably fitted to tube 32 and to nose end 21 of tube 20, these tubes being of substantially the same interior diameter for passage of missile 14. Plug 10 has a cylindrical body 42 formed by a central shell 44 which extends between a first axial end portion 45 of body 42 and an opposite second axial end portion 46, first end portion 45 being coaxially and slidably receivable within nose end 21 of tube 20 when the plug is inserted through tube 32 in a direction toward tube 20. Plug 10 has a flange 48 circumscribing body end portion 46 which positions plug end portion 46 at launcher tube end 33 when plug 10 is so inserted. The axial length of body 42 is such that, when body end portion 46 is so positioned, plug 10 extends through tube 20 with body end portion 45 received within tube 20 inwardly of nose end 20 thereof.

Body 42 has a perforate disk 60 extending transversely of shell 44 across first end portion 45 of the body, this end portion, typically, being coextensive with disk 60 which is releasably connected to shell 44 by screw threads 62. The periphery of disk 60, which has substantially the same diameter as the balance of plug periphery 40, has an annular, circumscribing groove 64, and has a central circular opening 65, which is coaxial with periphery 40, for a purpose subsequently explained. Disk 60 has a plurality of perforations or circular openings 66, extending through it axially. Disk 60 bears an annular valve seat 68 adjacent to its periphery and circumscribing openings 66. Seat 68 is disposed oppositely of disk 60 from second end portion 46 of body 42 and is, preferably of frusto-conical configuration. It is evident that plug 10 has a perforate end corresponding to perforate disk 60 and to body first end portion 45.

Body 42 has an end bulkhead 70 at body second end portion 46 and has a central bulkhead 71 extended transversely across shell 44. These bulkheads close off the shell so as to define a spacer compartment 73 between the bulkheads and a desiccant compartment 74 between bulkhead 71 and disk 60. It is evident that bulkheads 70 and 71 are spaced from disk 60 toward second end portion 46 and that plug 10, because of these bulkheads, has a closed end opposite its perforate end corresponding to disk 60. Bulkheads 70 and 71 each have a central opening 76. A tube 77 extends from opening 76 in bulkhead 71 through opening 65 in disk 60 when disk 60 is installed into shell 44 by screw threads 62. The periphery of tube 77 is closely fitted within opening 65. Openings 76 and tube 77 have substantially the same diameter and are coaxially related to plug periphery 40. An indicator tube 81 extends axially but eccentrically of body 42 between bulkheads 70 and 71, the ends of tube 81 being fixed to the bulkheads in hermetically sealed relation. Bulkhead 70 is spaced inwardly from flange 48 within shell 44 to form a cylindrical recess 83 in the shell second end portion 46. Shell 46 has an annular groove 84 circumscribing it adjacent to flange 48 for a purpose subsequently described. Shell 44, bulkheads 70 and 71, and tubes 77 and 81 are depicted as a unitary construction but may, of course, be built up of elements fixedly connected in any suitably manner.

Plug 10 has a pair of O-rings 85 and 86 received respectively in grooves 64 and 84. Rings 85 and 86 are, as seen in FIGS. 1 and 3, disposed for engagement between body 42 and the interiors of, respectively, container tube 20 and launcher tube 32. It is evident that ring 85 circumscribes body 42 at its perforate first end portion 45 and serves as a sealing element which minimizes leakage of humidity into container tube 20 at nose end 21 thereof along periphery 40 of plug 10. O-ring 86 serves to take up clearance between plug 10 and tube 32 and to frictionally retain the plug therein. Plug 10 has, as shown in FIG. 2, a humidity indicator 88 of well-known construction which is screw threadably connected to indicator tube 81. Indicator 88 is subjected through tube 81 to humidity in compartment 74 and has a window, not shown but viewable axially of plug 10, to view a color change corresponding to such humidity.

Plug 10 has a valve rod 90 which extends axially and centrally of body 42 and through bulkheads 70 and 71 and disk 60. Rod 90 has an end disposed in recess 83 and having a transverse bore 91 and has an opposite end extended from disk 60 and bearing screw threads 92. Rod 90 extends through openings 76 and within tube 77 and is slidably fitted therein for movement axially of body 42. Rod 90 has an annular groove disposed within tube 77 and containing an O-ring 94. It is evident that rod 90 is mounted in body 42 and that O-ring 94 is received in the body and circumscribes the rod so as to minimize leakage of humidity along the rod between body end portions 45 and 46.

Plug 10 has a valve disk 100 best shown in FIGS. 2 and 3. Disk 100 has a central screw threaded bore 101 which engages screw threads 92 of rod 90 so that this disk is mounted on the rod for movement therewith axially of body 42. It is apparent that valve disk 100 is mounted on rod 90 oppositely of perforate disk 60 from bulkheads 70 and 71. The periphery of disk 100 is frustoconical and conforms to and is aligned radially of plug 10 with valve seat 68. Disk 100 is thus movable by rod 90 toward and from a seated relation with seat 68, this relation being shown in FIG. 2 and indicated by numeral 103. When moved from the seated relation, the disk has an open relation, indicated by numeral 104 in FIG. 3, in which communication is established between compartment 74 in the interior of plug 10 for entry of humidity into this compartment from the interior of tube 20 as indicated by arrows 106. Disk 100 serves to close off such communication when in its seated relation 103. The periphery of disk 100 is provided with an annular groove which receives an O-ring 108 which engages seat 68 when the disk is in its seated relation 103.

As best seen in FIG. 3, compartment 74 is configured to slidably receive any suitable number, such as three, of the previously described toroidal packages 27 of desiccant 28 with the packages disposed in circumscribing relation to tube 77 and to valve rod 90 therein. Packages 27 are retained in plug 10 by perforate disk 60 so that humidity entering the plug through openings 66 as indicated by arrow 106 can be absorbed by desiccant 28. It is evident that screw threads 62 releasably connect disk 60 to shell 44 for removal of this disk to insert of packages 27 into compartment 74 and to install this disk to the shell to retain the packages therein. It is also evident that valve disk 100 is releasably connected to valve rod 90 by screw threads 92 and screw threaded bore 101 for removal of the valve disk from the rod for access to perforate disk 60 and for attachment of the valve disk to the rod for movement of the valve disk therewith.

Plug 60 has any suitable manually actuated mechanism, such as that indicated in the figures by numeral 110, connected to valve rod 90 for selectively moving this rod and valve disk 100 so as to move this disk toward and from its seated relation 103. Mechanism 110 is mounted on bulkhead 70 at shell end portion 42 so as to be accessible axially of plug 10 when the plug is inserted through tube 20 into tube 32.

Mechanism 110 is mounted on bulkhead 70 by a pair of lugs 115 extended axially from the bulkhead oppositely of valve rod 90. Lugs 115 have individually aligned bores 116 which are disposed oppositely of rod bore 91 from bulkhead 70 and which receive a pivot pin 117 on which is pivoted a cam disk 118. Disk 118 is disposed between lugs 115 and has a slot 119 into which rod 90 extends. Disk 118 has a pair of cam grooves 121 disposed oppositely of slot 119 and receiving the opposite ends of a cam pin 122 which extends transversely of rod 90 through bore 91. Grooves 121, as seen in FIG. 3, are generally semicircular about pivot pin 117, but have a first portion 125 which is radially further from pin 117 than a second portion 126 of the grooves so that pivotal movement of disk 115 to engage groove portion 125 with pin 122 motivates rod 90 to carry valve disk 100 to its open relation 104 while pivotal movement of the cam disk to engage pin 122 with groove portion 126 motivates rod 90 to carry disk 100 into its seated relation 103. Grooves 121 have any suitable transition region between regions 125 and 126. Cam disk 115 is provided with a Tee-handle 128 graspable to pivot the cam disk and for carrying plug 10.

Handle 128 has a "closed" position 130, a "carrying" position 131 and an "open" position 132 depicted in solid lines, respectively, in FIGS. 1, 2, and 3. Positions 130 and 131 are depicted in dash lines in FIG. 3. In position 130, handle 128 extends normally to valve rod 90, cam grooves 121 being configured so that disk 100 is then in its seated relation 103. In position 131, handle 128 extends axially from rod 90, grooves 121 being configured so that disk 100 remains in its seated relation 103. In position 132, handle 128 extends transversely of rod 90 but oppositely of position 130, grooves 121 being configured so that disk 100 is then in its open relation 104 to valve seat 68.

OPERATION

The operation of plug 10 is believed readily apparent and will be briefly described. Plug 10 is loaded with desiccant packages 27, which preferably are taken from a corresponding number of the above-mentioned caps for end 21 of tube 20, by unscrewing disk 100 from rod 90 and then unscrewing disk 60 from shell 44 for access to compartment 74. Disks 60 and 100 are then reinstalled and handle 128 moved to its position 130 to seat disk 100 on valve seat 68 so that desiccant 28 is not vitiated by environmental humidity prior to use. When plug 10 is being carried to storage or for use, handle 128 is moved to its position 131 for convenience in manipulating the plug without access of humidity to desiccant 28.

To use plug 10 to prevent missile 14 from being rendered inoperational by humidity when the missile and its tube 20 are mounted in standby status to tube 32, plug 10 is inserted through tube 32 into end 21 of container tube 20 so that O-ring 85 seals the interior of the plug and container tube against access by environmental humidity.

Handle 128 is preferably utilized in its position 131 to facilitate such insertion and the handle is then moved to its position 132 to unseat disk 100 and allow desiccant 28 to absorb moisture from missile 14 and the interior of tube 20. When launcher 12 is utilized to carry missile 14 on a mission in which the missile may be fired, plug 10 is withdrawn from tubes 20 and 32 and stored for further use. Plug 10 may be used to prevent humidity from rendering a missile, such as missile 14, inoperational or may be used to desiccate such a missile already rendered inoperational by humidity. When plug 10 is so used or is being stored, indicator 88 serves to monitor the condition of desiccant 28 so that the desiccant can be dried or replaced when it is vitiated.

Obviously many modifications and variations of the present invention are possible in light of the above teachings. It is, therefore, to be understood that the invention may be practiced within the scope of the following claims other than as specifically described.

What is claimed is:

1. In a missile launching apparatus having:
a frame;
a launcher tube mounted on the frame and having an open forward end and an open rearward end;
a container tube having an open nose end and a hermetically closed tail end, the container tube being disposed in coaxial relation to the launcher tube with said nose end slidably received in said rearward end;
a device releasably retaining the container tube to the frame; and
a missile which is adversely affected by humidity and is disposed in the container tube between said ends thereof,
the improvement comprising:
a hollow cylindrical plug which has a periphery slidably fitted within the launcher tube and within the nose end of the container tube, has a perforate end, and has an axially opposite closed end, the plug being extended through the launcher tube with the perforate end of the plug received in the nose end of the container tube and with the closed end of the plug adjacent to the forward end of the launcher tube;
a quantity of desiccant disposed within the plug; and
means for retaining the desiccant within the plug so that the desiccant absorbs humidity entering the plug through the perforate end thereof from the container tube.

2. The apparatus of claim 1 wherein the launcher tube has a predetermined axial length and wherein:
the plug bears at said closed end means for positioning said closed end at the forward end of the launcher tube when the plug is inserted therein in a direction toward the container tube;
the axial length of the plug is such that when said positioning means so positions said closed end in relation to said forward end, the perforate end of the plug is received within the container tube inwardly of the nose end thereof; and
the plug bears annular sealing means circumscribing the plug adjacent to said perforate end thereof for minimizing passage of humidity into the container tube through the nose end thereat between the interior of the container tube and the periphery of the plug.

3. The improvement of claim 1 further comprising:
valve means disposed at the perforate end of the plug for opening and closing communication between the interior of the plug and the interior of the container tube; and
means, which are mounted on the plug and accessible from the exterior of the launcher tube when the plug extends therethrough, for manually actuating the valve means to selectively open and close said communication.

4. A desiccant plug for use with a cylindrical tube containing a missile and having an axially open end, the plug comprising:
a cylindrical body having
a first axial end portion coaxially and slidably receivable within the tube through said open end,
a second axial end portion opposite said first end portion,
a cylindrical shell extending between said end portions,
a perforate disk extending transversely of the shell across said first end portion and bearing a annular valve seat disposed peripherally of said first end portion and oppositely thereof from said second end portion, and
a bulkhead spaced from the perforate disk toward said second end portion and extended transversely across the shell in closing relation thereto;
a valve rod extending through said bulkhead and said disk axially and centrally of the body;
means for mounting the valve rod on the body for movement axially thereof;
first sealing means, which is received in the body and circumscribes the valve rod, for minimizing leakage of humidity therealong between said end portions;
a quantity of desiccant received in the shell between said disk and said bulkhead;
a valve disk mounted on said rod oppositely of said perforate disk from the bulkhead, the valve disk being connected to said rod for movement therewith toward and from seated relation of the valve disk with the valve seat;

manually actuated means, which are connected to the valve rod and are disposed at the first end portion of the plug for access axially thereof, for selectively moving the valve rod and the valve disk to move the valve disk toward and from said seated relation; and annular second sealing means, which circumscribes the body of the first end portion thereof and is disposed for engagement between the body and said tube when said end portion is received within the tube, for minimizing leakage of humidity into the tube along the periphery of the body.

5. The plug of claim 4 wherein:

said quantity of desiccant is disposed in a generally turoidal package which is slidably received in the shell in circumscribing relation to the valve rod;

the perforate disk is releasably connected to the shell for removal of said disk from the shell to insert said package therein and for installation of said disk to the shell to retain said package therein; and the valve disk is releasably connected to the valve rod for removal of the valve disk therefrom for access to the perforate disk and said package and for attachment of the valve disk to the valve rod for movement of the valve disk therewith.

* * * * *